Dec. 29, 1959     C. H. ROBERTS     2,919,162
ANTI-SKID MECHANISM FOR AIRCRAFT LANDING WHEELS
Filed Aug. 17, 1955     3 Sheets-Sheet 1
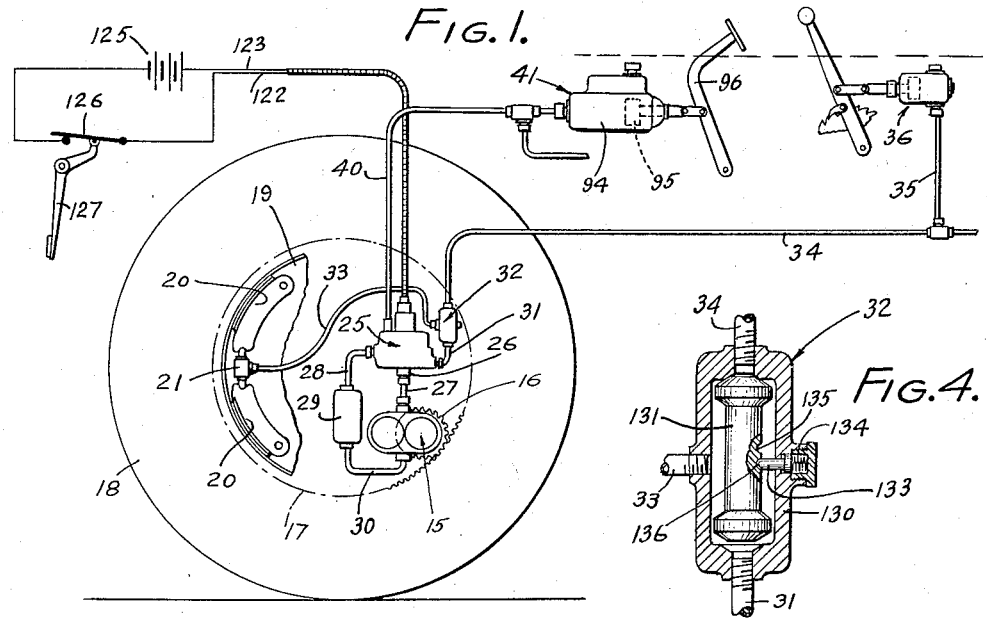
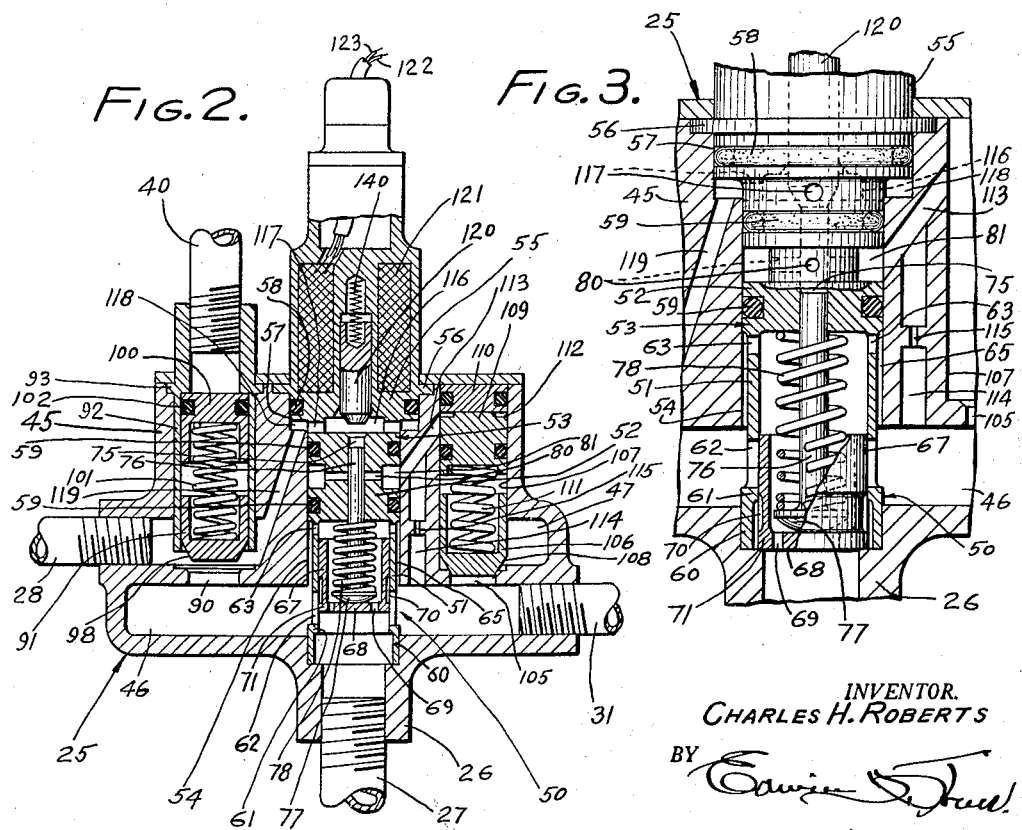
INVENTOR.
CHARLES H. ROBERTS
BY
ATTORNEY

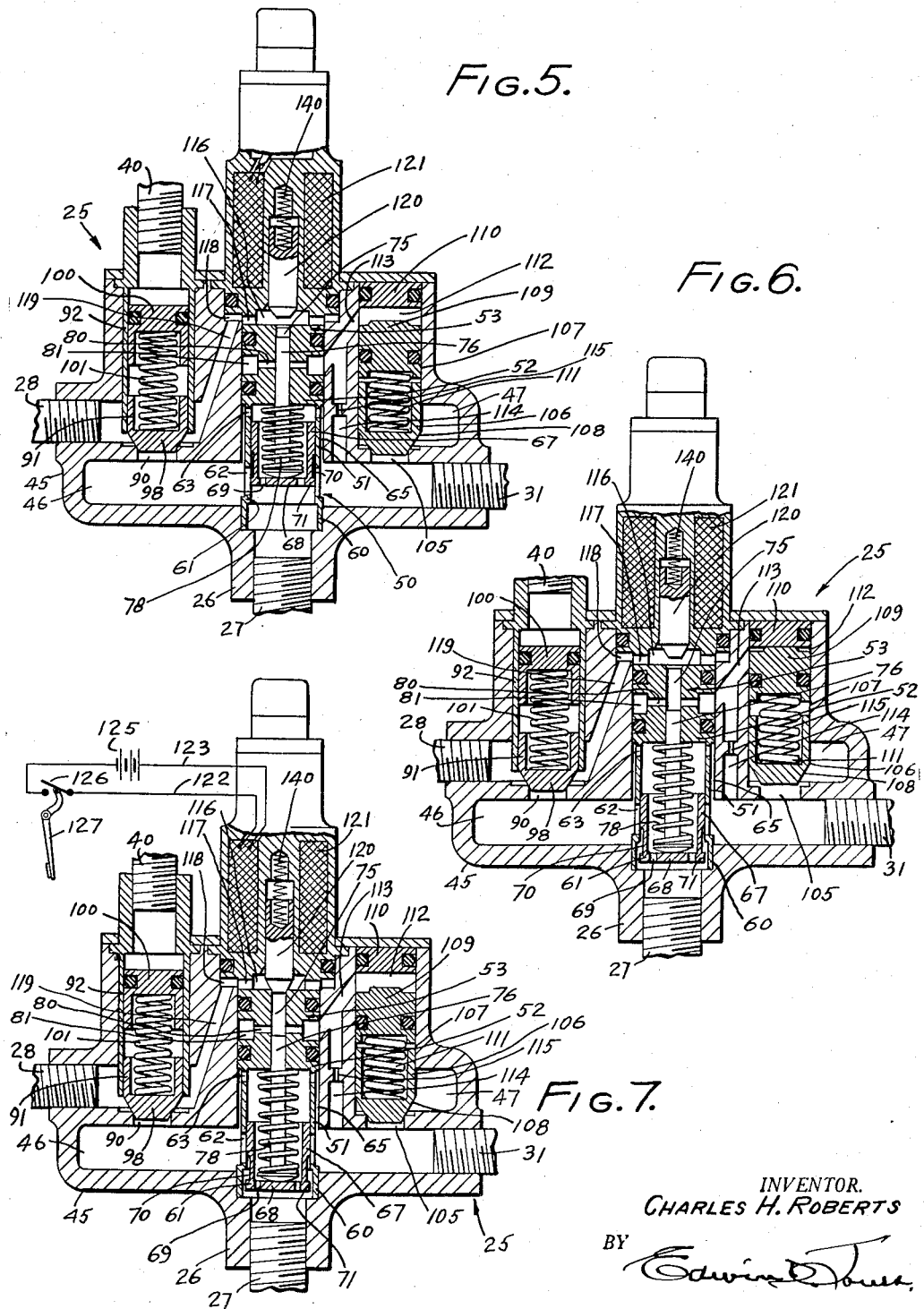

Dec. 29, 1959    C. H. ROBERTS    2,919,162
ANTI-SKID MECHANISM FOR AIRCRAFT LANDING WHEELS
Filed Aug. 17, 1955    3 Sheets-Sheet 3
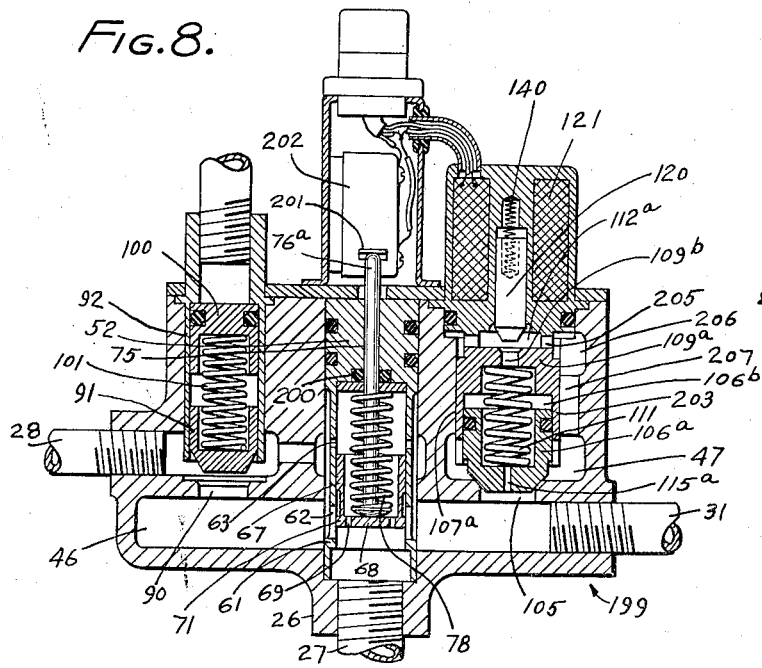
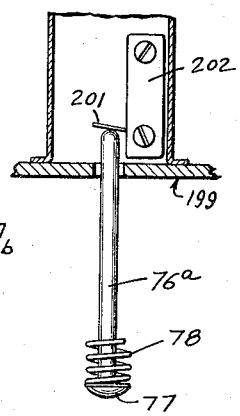
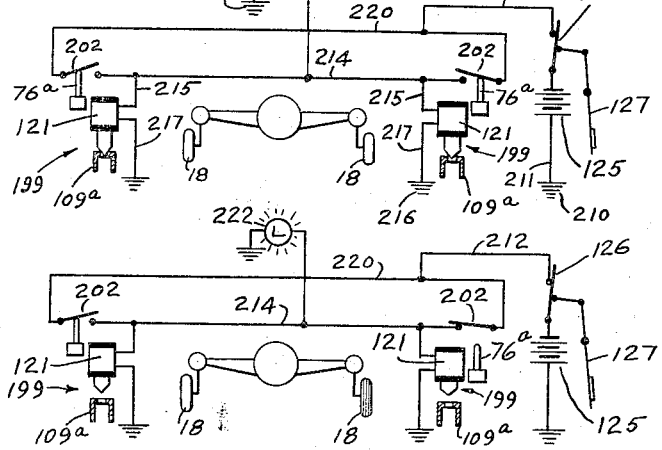
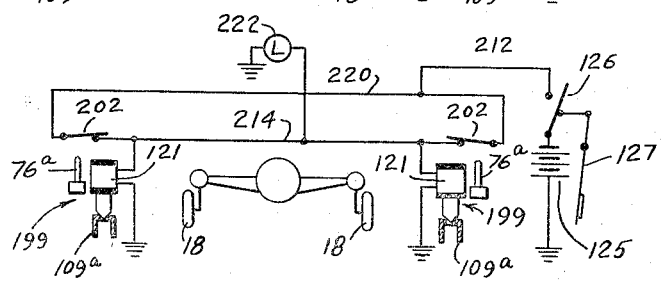
INVENTOR.
CHARLES H. ROBERTS
BY
ATTORNEY _United States Patent Office_

2,919,162
Patented Dec. 29, 1959

2,919,162
ANTI-SKID MECHANISM FOR AIRCRAFT LANDING WHEELS

Charles H. Roberts, Sun Valley, Calif.

Application August 17, 1955, Serial No. 528,917

7 Claims. (Cl. 303—21)

This invention relates generally to landing gear for aircraft and more particularly to anti-skid means for the wheels of the landing gear when the latter are rolling on the ground.

Should skidding of the landing wheels on the ground occur as the aircraft is landing the situation may be extremely hazardous particularly if the brakes are being applied at the time, and it is, therefore, an object of the present invention to provide an effective anti-skid braking mechanism.

Another object of the invention is to provide mechanism of this character that is extremely sensitive and effective in operation.

Still another object of the invention is to provide mechanism of this character that, when skidding occurs, will provide quick release of fluid braking pressure and a relatively slow build-up of such pressure, and, consequently, a relatively slow reapplication of the brake or brakes after a skid recovery.

Another object of the invention is to provide means or mechanism of this character wherein the anti-skidding action may be cut out when it is desired to have the brakes function without the anti-skidding control.

A further object of the invention is to provide anti-skidding mechanism of this character that is automatic.

A still further object of the invention is to provide mechanism of this character that may be used on wheels arranged in tandem and on wheels which are spaced laterally apart a substantial distance.

Another object of the invention is to provide mechanism of this character employing fluid pump means driven by the landing gear wheels. Some of the advantages of the use of such fluid pump means are:

(1) The fluid system in which the pump means is embodied is simple, and has relatively few parts so that the sensitivity lag is at a minimum.

(2) The pump means may be independent of the aircraft's hydraulic system.

(3) A positive skid-sensing means is provided.

(4) The skid-sensing brake-release and brake reapplication is controlled by the rotational speed of the wheels.

The characteristics and advantages of the invention are further sufficiently referred to in connection with the following detailed description of the accompanying drawings wherein several embodiments are illustrated. After considering these examples, skilled persons will understand that many variations may be made without departing from the principles disclosed and I contemplate the employment of any structures, arrangements or modes of operation that are properly within the scope of the appended claims.

Referring to the drawings which are for illustrative purposes only,

Fig. 1 is a view showing diagrammatically a hydraulic brake system embodying the present invention.

Fig. 2 is a schematic view through the hydraulic control mechanism of the system.

Fig. 3 is an enlarged fragmentary view of the sensing mechanism.

Fig. 4 is an enlarged sectional view of the shuttle valve for the emergency brake system.

Figs. 5, 6 and 7 are views similar to the view of Fig. 2, but showing the operating parts in the various positions they assume under various operating conditions.

Fig. 8 is a sectional view showing an alternative control mechanism.

Fig. 9 is an enlarged diagrammatic view, partially in section, showing one of the switch actuating mechanisms of the electrical system disclosed in Figs. 10, 11 and 12; and Figs. 10, 11 and 12 are schematic views showing an alternative system wherein the mechanism of Fig. 8 is incorporated.

Referring to Fig. 1 the brake system comprises a displacement type pump indicated generally at 15. The pump is provided with a gear 16 meshed with an internal gear 17 of a landing gear wheel 18, it being understood that each of the landing gear wheels is provided with the anti-skid control mechanism hereinafter described. The wheel 18 is provided with a brake drum 19 engageable by brake shoes 20 actuated in the usual manner by pistons, not shown, in a hydraulic brake cylinder 21. A hydraulic control mechanism, indicated generally at 25, has an inlet 26 connected by a conduit 27 with the outlet of the pump 15. The mechanism 25 has a connection 28 with a brake-capacity reservoir 29 which, in turn, is connected by a conduit 30 with the inlet side of the pump 15. The mechanism 25 also has a connection 31 with a shuttle valve 32 which, in turn, has a connection 33 with the brake cylinder 21. The shuttle valve 32 also has a connection 34, 35, with an emergency brake control mechanism indicated generally at 36. There is also a connection 40 between the mechanism 25 and the normal brake control, indicated generally at 41, as will be more particularly described hereinafter.

The control mechanism 25 comprises a housing 45 having a chamber 46 which leads to the valve 32, and, hence, to the brake cylinder 21. There is also a chamber 47 to which the conduit 28 is connected and which leads to the brake-capacity reservoir, and thence, to the inlet of the pump 15. The inlet 26 is connected to the chamber 46 and this connection is controlled by a sensing valve mechanism, indicated generally at 50.

The sensing mechanism 50 includes a sleeve 51 depending from the lower end of the body 52 of an insert, indicated generally at 53. The body 52 is received in a bore 54 which is axially aligned with the inlet 26, the body having an enlarged head portion 55 with a seating flange 56 received in a recess provided in the housing 45. It is to be noted that the head 55 is of larger diameter than the body 52 and is received in counter-bore 57 provided therefor in the housing 45.

The head 55 is provided with a suitable seal 58 and the body 52 is also provided with seals 59 spaced apart longitudinally with respect to the body. The sleeve 51 has an enlarged lower end 60 received in a counter-bore provided therefor in the housing 45, and it is to be noted that the sleeve is of smaller outside diameter than the inside diameter of the bore 54. The sleeve has an internal shoulder 61 just below ports 62 which provide communication between the interior of the sleeve and the chamber 46.

The sleeve 51 is also provided with ports 63 adjacent the junction of the sleeve with the body 52 which provides communication between the interior of the sleeve and the chamber 46 through the space 65 between the exterior of the sleeve and the interior wall of the bore 54. Within the sleeve 51 is a sensing piston 67 which has a closed end 68 with orifices 69 therein. The piston 67 also is provided with an annular recess 70 adjacent the lower end thereof so as to provide a shoulder 71 adapted to coact with the shoulder 61 under conditions to be hereinafter described.

The head 52 of the insert 53 is provided with a longitudinally extending axial bore 75 in which is slidably disposed a plunger 76 which serves as and is termed a pilot valve member. The lower end of the valve member 76 is provided with a head 77 which rests on the wall 68 of the piston 67 and is urged thereagainst by a spring 78 which reacts between the head and the adjacent end of the body 52 to urge both the valve member 76 and piston 67 downwardly. Between the seals 59 there is a cross bore 80 which communicates with an annular external groove 81 in the body 52 and intersects the bore 76.

Chambers 46 and 47 have a connection 90 which is controlled by a relief valve having a movable valve member 91 slidable in a sleeve 92 received in a bore provided therefor in the housing 45. The sleeve 92 is provided with an annular flange 93 seated in a recess provided therefor in the housing 45, and the sleeve threadably receives the adjacent end of the conduit 40 which has its opposite end connected with the master cylinder 94 of the brake control mechanism 41. The master cylinder 94 has a piston 95 actuated by a brake pedal 96 in the usual manner. It is to be understood, of course, that any suitable mechanism may be used to actuate the piston 95 of the master cylinder.

The relief valve member 91 is disposed in the lower end of the sleeve 92, and has a tapered end portion 98 adapted to control the port 90 between the chambers 46 and 47. A slave piston 100 is slidably disposed in the upper end of sleeve 92 and the piston and valve member 91 are urged apart by a spring 101. A ring seal 102 is provided on the slave piston to effect a hydraulic seal between said piston and sleeve 92.

Chambers 46 and 47 have another connection by means of port 105 which is controlled by a brake dump valve member 106 slidable within a bore 107 provided in the housing 45. Valve member 106 has a tapered end portion 108 which controls the port 105. In the upper end of the bore 107 there is a dump valve piston 109 which is slidable in the bore and limited in movement away from the member 106 by means of a block 110 in the upper end of the bore above the dump valve piston.

A spring 111 reacts between said dump valve 106 and the dump valve piston 109 and urges same apart, so that the valve 106 normally closes the port 105. The upper end of the piston 109 is relieved to provide a space 112 adapted to be connected with the recess 81 by means of a passage 113. Passage 113 and chamber 46 are connected together by means of a passage 114 having a restricted orifice 115 therein. The upper end of bore 75 in body 52 communicates with a chamber 116 which is connected through ports 117 and space 118 and passage 119 with the chamber 47.

Bore 75 is also controlled by a movable valve member 120 which comprises a movable armature operable within a solenoid coil 121. Solenoid coil 121 is connected by wires 122 and 123 with a suitable source of electric power such as, for example, a battery 125, and the circuit of wires 122 and 123 is controlled by a switch 126 which may be actuated by any suitable means. One of such means may be the landing gear, not shown, of the aircraft and such connection includes a switch actuating part 127. The switch 126 is normally closed when the aircraft landing gear is up and opens under predetermined compression of the landing gear when the latter is down.

With reference to the shuttle valve shown in Fig. 4, it is to be noted that it is of well known construction and operation. Briefly this valve comprises a housing 130 in which a shuttle valve member 131 is disposed. The member 131 has two positions, one in which the connection 34 with the emergency mechanism 36 is shut off, and the other in which the connection between the mechanism 25 and the brake cylinder 21 is cut off. The valve member 131 is releasably held in either of these positions by a plunger 133 urged inwardly by a spring 134 for engagement with one or another of a pair of notches 135 and 136 in the spindle of the valve member 131, and the spindle is operably moved or actuated accordingly as fluid pressure is applied to one end or the other thereof.

Assuming the aircraft is in the air and is coming in for a landing, the operation of the mechanism will be as follows, at which time the switch 126 is closed and solenoid valve 120 of each wheel is off its seat:

When the landing gear is lowered and the wheels are rolling on the ground during the landing operation, the pumps are driven through the gears 17 and 16 to effect a flow of hydraulic fluid through the system. Before application of the brakes the fluid for each anti-skid brake mechanism flows through the conduit 27 and into the anti-skid brake valve 25 by way of the inlet 26. The fluid pressure in the inlet raises the sensing piston 67 upwardly, the pilot valve member also being raised to cut off communication between the cross passages 80 and bore 75.

It will be assumed that fluid already fills conduit 31, the valve 32, conduit 33 and the brake cylinder 21, the shuttle valve 32 being in the uppermost position shown in Fig. 4. Fluid also is present in the space 112 above piston 109 as well as the passages 114, 113, recess 81 and cross-bore 80. The fluid in chamber 46 flows through port 90 into chamber 47, thence to the inlet side of the pump by way of the conduit 28, reservoir 29 and conduit 30. No braking pressure is applied at this time and the valve member 91 is raised by the pressure in chamber 46 to permit fluid flow through port 90 and back to the pump.

In Fig. 5 the anti-skid valve is shown with the parts in their respective positions as a result of application of pressure from the master cylinder 94 to effect closing of the relief valve member 91. Pressure from the master cylinder 94 urges the piston 100 downwardly, as shown in Figs. 5, 6 and 7, and compresses spring 101 which effects closing of the port 90 by valve 91. The loading of valve member 91 by the spring 101 determines the amount of fluid pressure that will be applied to the pistons of the brake cylinder 21 to effect braking action.

Fluid pressure in the chamber 46 is applied to the upper side of the dump valve piston 109 through the restricted orifice 115, and forces the piston downwardly thereby compressing spring 111. This spring pressure holds the dump valve member 106 on its seat about port 105. At this time the pilot valve member 76 cuts off fluid flow into chamber 47 through bore 75, chamber 116, ports 117, space 118 and passage 119.

When the pressure in chamber 46 increases sufficiently to overcome the force of spring 101 on valve member 91 effected by the fluid pressure from the master cylinder 94, acting on piston 100, the relief valve member 91 is forced from its seat and fluid will flow through port 90, into chamber 47 and back to the pump inlet through conduit 28, reservoir 29 and conduit 30.

Referring to Fig. 6, the solenoid coil 121 is still energized and the valve 120 is raised, that is, the valve is in the open position and pressure from the master cylinder 94 is still being applied to the piston 100. Should a skid of one of the wheels 18 occur the anti-skid brake thereof unloads. This occurs because the rate of wheel rotation is reduced as the wheel skids, thereby resulting in slowing of the speed of the pump and reducing fluid flow therefrom. When the pump flow falls below the amount adapted to pass through the venting orifices 69 in the flow sensing piston 67, the latter then moves downwardly and passes the point of maximum restriction, whereat the shoulders 71 and 61 are in operative engagement.

As the piston 67 moves downwardly from the position of maximum restriction, fluid will flow from the inlet 26 through the recess 70 and into the chamber 46, whereupon the piston will move rapidly downward under the force of spring 78. The pilot valve member 76 also moves downwardly in the bore 75 to uncover the cross-bore 80 thereby opening communication between the upper end of the dump valve piston 109 and the chamber 47 by way of passage 114 above the restriction 115, the recess or groove 81, cross-bore 80, bore 75, chamber 116, passages 117, space 118, and passage 119. Pressure above the piston 109 drops rapidly because of the restricted orifice 115, and the dump valve member, relieved of the major portion of spring pressure thereon, rises under the pressure of fluid in chamber 46 and opens the port 105 to relieve the pressure to the brake cylinder 21. Thus the wheel is freed from skid-producing brake pressure.

As soon as the wheel stops skidding, it again picks up speed and restores flow from the pump, and the ports 69 of the piston 67 will by-pass the flow until the wheel-driven pump reaches a speed which will produce enough flow to move the piston 67 upwardly against the spring 78 and move the pilot valve member 76 upwardly to block the flow through the bore 75. When this flow is blocked fluid pressure is again applied to the upper end of piston 109 by the fluid which flows at a relatively slow rate through the restricted orifice 115.

Fluid passing through the restricted orifice 115 will force the piston 109 downwardly at a controlled rate to slowly compress the spring 111 so as to effect a gradual pressure increase in the chamber 46. Due to the slow increase in the pressure build-up in chamber 46, the braking action regenerates without producing another skid such as would occur should the pressure be suddenly reapplied to the brakes. Valve member 106 continues to seat with continued pressure until the pressure level of the relief valve 91 takes over its normal function, the valve 106 remaining closed until it opens as a result of the porting action of the flow sensing piston 67 should another skid occur.

The mechanism also is adapted to function as a brake valve with the anti-skid control rendered inoperative. During the final stopping phase, fluid flow from the wheel-driven pump 15 will be below the flow-sensing valve cut-out range which would cause the release of brake pressure should the solenoid valve member 120 be in the open position. This is effected by closing of the bore 75 by the valve member 120 upon deenergization of the solenoid coil 121.

The energization of the coil 121 is controlled by the switch 126 which is moved to open position by predetermined compression of the landing gear shock strut or other operation which is automatic with the final landing phase of the plane. The deenergization of the solenoid coil allows spring 140 to move the valve member 120 downwardly to close the adjacent end of the bore 75, and thereby prevent fluid flow therethrough to the chamber 47, thereby holding the brake pressure in chamber 47 to maintain the brakes in the set position.

Referring to Figs. 8 to 12, inclusive, there is shown an alternative anti-skid arrangement where the wheels are spaced laterally apart a substantial distance. This arrangement, indicated generally at 199, functions in a manner similar to the mechanism hereinabove described but has certain differences. The mechanism of Figs. 8 to 12 includes the relief valve mechanism having the relief valve member 91. There is also the sensing mechanism, including the piston 67 and a plunger 76a which corresponds to the plunger 76 in Figs. 1 to 7. The body 52 has a longitudinal bore 75 in which plunger 76a is slidable and is provided with a seal 200. The plunger 76a actuates the movable switch lever 201 of a switch 202.

There is a dump valve having a dump valve member 106a slidable within a sleeve 203 of a guide 109a in bore 107a. A passage leads from chamber 46 to a chamber 112a at the upper end of guide 109a, the passage including a restricted orifice 115a through the end wall of valve member 106a. Fluid passing through orifice 115a flows through the hollow interior of the valve member 106a and the guide 109a which forms a chamber 106b, and, thence, through port 109b in the guide and into chamber 112a, fluid flow through port 109b being controlled by a solenoid valve member 120.

From chamber 112a there is a fluid passage to the chamber 47, the passage including ports 205, enlarged portion 206 and passage 207. Spring 111 reacts between the guide 109a and valve member 106a and urges the latter closed. When solenoid valve 120 is closed there is a build up of pressure in the chamber 106b between the guide 109a and valve member 106a which holds the latter closed. When valve 120 is opened this valve-closing pressure is quickly released through port 109b, ports 205, chamber 206 and passage 207.

The wiring system of the alternative arrangement is shown in Figs. 10, 11 and 12. Each wheel 18 is provided with an anti-skid control mechanism 199, shown in Fig. 9. Switches 202 are arranged in an electrical system including a source of power, such as battery 125, for example, the latter being grounded at 210 by means of a wire 211 from one side of the battery. Switch 126 is in a line wire 212 from the opposite side of the battery. Wire 212 is connected to a wire 220 connected to one terminal of each switch 202. Switches 202 each have a second terminal and these are connected together by a wire 214 from which leads 215 provide connections with the solenoid coils 121, the latter being grounded at 216 by respective wires 217. The system also includes a warning light 222, connected to wire 214 by a wire 221, the light being grounded at 223, light 222 becoming illuminated when either switch 202 is closed. Closing of either switch 202 effects energization of both solenoid coils 121 to raise valve members 120 to open position, the switches being opened when the respective plungers 76a are raised, and closed when the plungers are in down position.

In Fig. 10, switch 126 is closed but switches 202 are open. When the wheels are rotating in contact with the ground the pump delivers pressure and raises the sensing pistons which, in turn, raises the plunger 76a to effect opening of the switches 202. In Fig. 11, switch 126 is closed but the right-hand switch 202, as shown in Fig. 10, is closed due to skidding of the right-hand wheel which results in reducing the action of the pump of the wheel and permits the sensing piston and plunger 76a to be moved down by spring 78. Both solenoid vales 120 are then opened to release the pressure in chamber 46 to the chamber 47 in the respective control mechanisms. This pressure release is very rapid and relieves the brakes of both wheels of braking pressure.

In Fig. 12, the switches 202 are both closed, but as switch 126 is open the solenoids are deenergized and the solenoid valves 120 are closed, preventing release of brake pressure in chambers 47. The anti-skid feature is thus cut out when a final stop is required.

What I claim is:

1. In a brake system for vehicle wheels having fluid actuated brakes: fluid pump means for each wheel for supplying fluid pressure to the brake of said wheel, said pump means being driven by said wheel; valve means for controlling the flow of fluid from said pump to the wheel brake, said means including a flow-sensing piston responsive to the flow of fluid from said pump, a poppet relief valve for relieving fluid pressure to the brake, a spring for said poppet valve, a slave piston acting on said spring to compress same and load said poppet relief valve in the closing direction; means for releasably moving said slave piston in the spring compressing direction; a dump valve for relieving fluid pressure to the brake, a dump valve piston, a spring between said dump valve and said dump valve piston, passage means connecting one end of said dump valve piston with the fluid pressure to said brake, said passage means including a restricted orifice; means controlled by the sensing piston for relieving the pressure behind said dump valve piston; and an electrically controlled valve adapted to prevent relief of pressure behind said dump valve piston when said electrically controlled valve is closed.

2. In a brake system for vehicle wheels having fluid actuated brakes: fluid pump means for each wheel for supplying fluid pressure to the brake of said wheel, said pump means being responsive to the rotational speed of said wheel; flow-sensing means responsive to the flow of fluid from said pump, a relief valve for relieving fluid pressure to the brake, a spring for said valve, means for compressing said spring to load said relief valve in the closing direction; a dump valve for relieving fluid pressure to the brake, a spring for said dump valve; pressure responsive means for compressing said dump valve spring; passage means for applying fluid pressure from said pump means to said pressure responsive means, said passage means including a restricted orifice; means controlled by the sensing means for relieving the pressure on said pressure responsive means; and an electrically controlled means adapted to relieve the pressure on said pressure responsive means.

3. A brake system for vehicle wheels having hydraulic brakes, comprising: a pump for each wheel for supplying hydraulic pressure to the brake of said wheel, said pump being driven by said wheel; flow-sensing means responsive to the flow of fluid from said pump, a relief valve for relieving fluid pressure to the brake, means for applying varying closing force on said relief valve; a dump valve for relieving fluid pressure to the brake; means for applying pump pressure on said dump valve in the closing direction, including means for restricting the rate of the build up of said pressure; and means controlled by the sensing means for quickly relieving said pressure on said dump valve.

4. A brake system for vehicle wheels having hydraulic brakes, comprising: a pump for each wheel for supplying hydraulic pressure to the brake of said wheel, said pump being driven by said wheel; flow-sensing means responsive to the flow of fluid from said pump, a relief valve for relieving fluid pressure to the brake, means for applying varying closing force on said relief valve; a dump valve for relieving fluid pressure to the brake; means for applying pump pressure on said dump valve in the closing direction, including means for restricting the rate of the build up of said pressure; means controlled by the sensing means for quickly relieving said pressure on said dump valve; and an electrically controlled valve adapted to prevent relief of fluid pressure applied to said dump valve.

5. A brake system for vehicle wheels having hydraulic brakes, comprising: a pump for each wheel for supplying hydraulic pressure to the brake of said wheel, said pump being driven by said wheel; flow-sensing means responsive to the flow of fluid from said pump, a relief valve for relieving fluid pressure to the brake, means for applying varying closing force on said relief valve; a dump valve for relieving fluid pressure to the brake; means for applying closing pressure to said dump valve, said means including means for applying pump pressure at a restricted rate; and means controlled by the sensing means for relieving the pump pressure for the dump valves of said wheels.

6. In fluid control means: a housing having a passage with an inlet, an outlet for connection with mechanism adapted to utilize fluid pressure in said passage, and a pair of relief outlets; a pressure-responsive valve controlling each of said relief outlets and urged in the opening direction by pressure in said passage; means for variably applying the closing force on one of said valves; means for applying a closing force, including fluid pressure, on the other of said valves; means for gradually building up said fluid pressure for said other valve; and means sensitive to fluid flow into the passage for effecting quick release of the fluid pressure effective on said other valve.

7. The invention defined by claim 6; including means operable independently of said sensitive means for preventing release of said pressure effective on said other valve.

References Cited in the file of this patent

UNITED STATES PATENTS

| | | |
|---|---|---|
| 2,417,211 | Newell | Mar. 11, 1947 |
| 2,631,696 | Yarber | Mar. 17, 1953 |
| 2,692,662 | Clifton | Oct. 26, 1954 |
| 2,776,027 | Pendlebury | Jan. 1, 1957 |

FOREIGN PATENTS

| | | |
|---|---|---|
| 290,713 | Great Britain | May 15, 1928 |